O. KUEKES.
COOKING STOVE.
APPLICATION FILED FEB. 4, 1913.
1,123,318.
Patented Jan. 5, 1915.
3 SHEETS—SHEET 1.
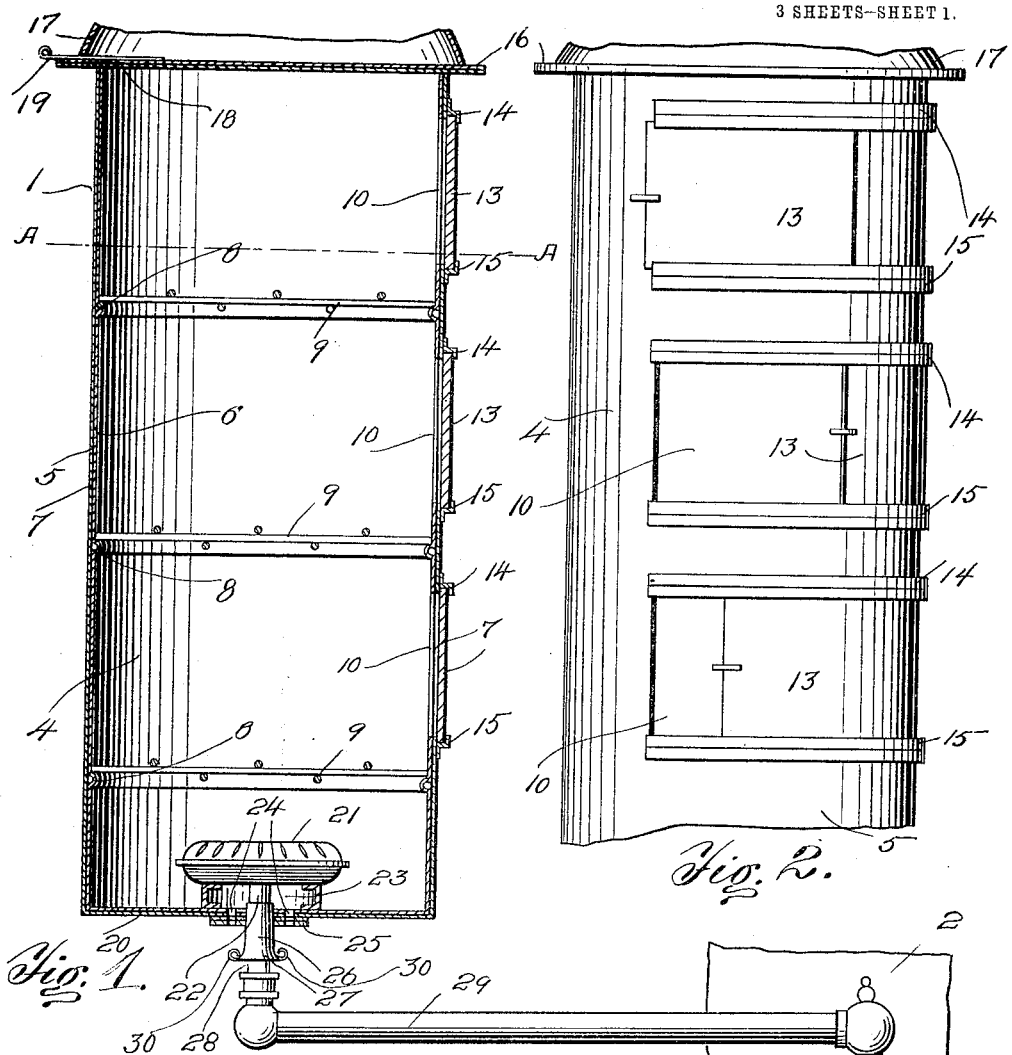
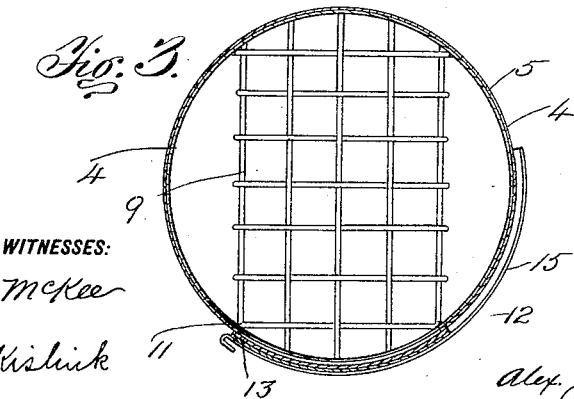
WITNESSES:
M. P. McKee
R. Kislick
INVENTOR
O. Kuekes
BY
Alex. J. Wedderburn, Jr.
ATTORNEY O. KUEKES.
COOKING STOVE.
APPLICATION FILED FEB. 4, 1913.
1,123,318.
Patented Jan. 5, 1915.
3 SHEETS—SHEET 2.
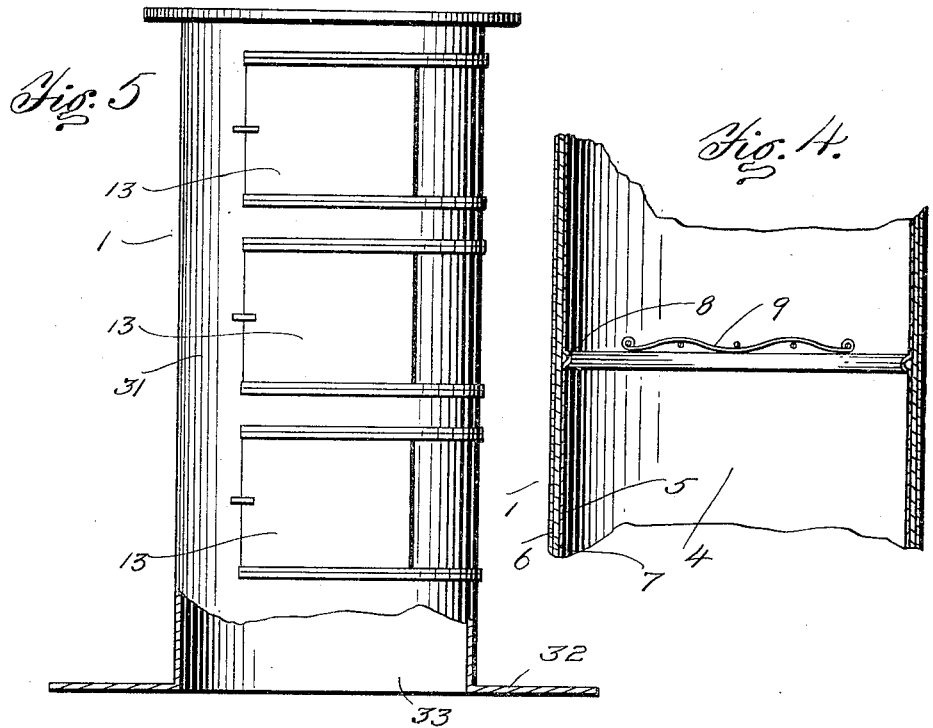
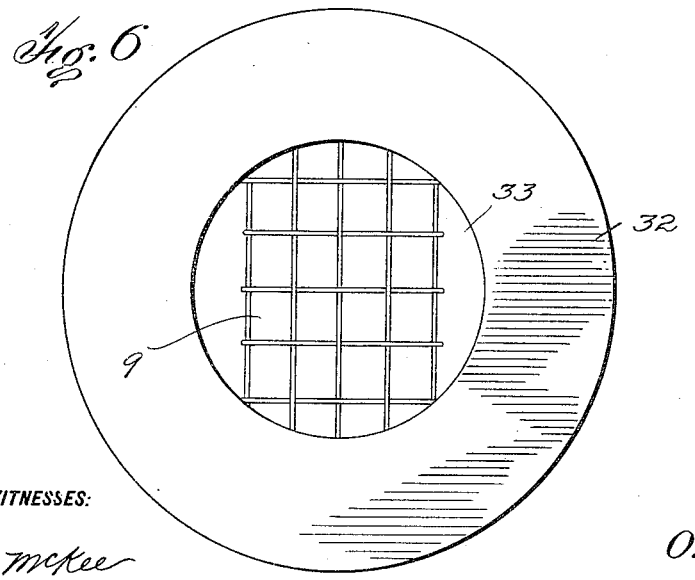
WITNESSES:
M. P. McKee
R. Kishnik
INVENTOR
O. Kuekes
BY
Alex. J. Wedderburn, Jr.
ATTORNEY O. KUEKES.
COOKING STOVE.
APPLICATION FILED FEB. 4, 1913.
1,123,318.
Patented Jan. 5, 1915.
3 SHEETS—SHEET 3.
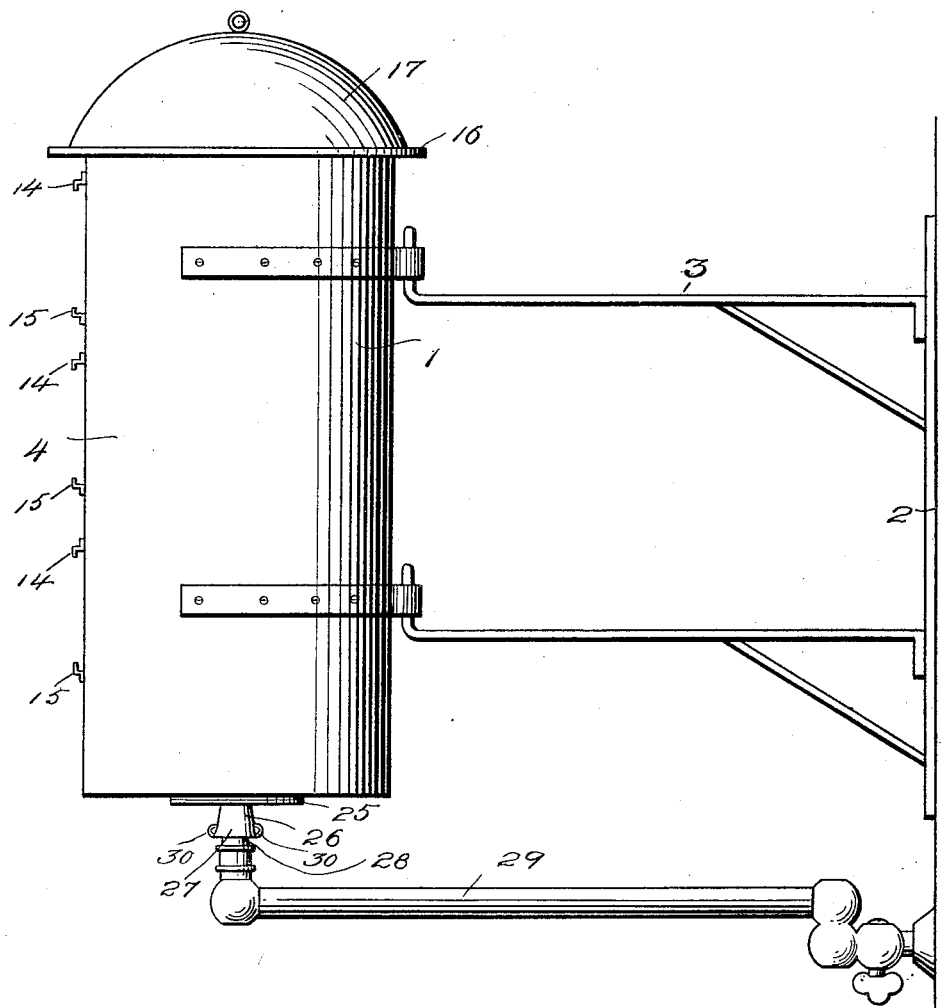
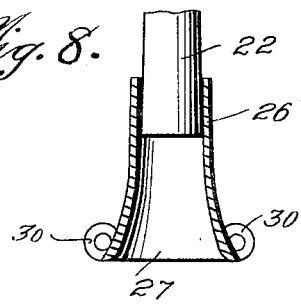
WITNESSES:
M. P. McKee
R. Kisluk
INVENTOR
O. Kuekes
BY
Alex. J. Wedderburn, Jr.
ATTORNEY

UNITED STATES PATENT OFFICE.

OTTO KUEKES, OF PITTSBURGH, PENNSYLVANIA.

COOKING-STOVE.

1,123,318.　　　　　Specification of Letters Patent.　　Patented Jan. 5, 1915.

Application filed February 4, 1913.　Serial No. 746,196.

*To all whom it may concern:*

Be it known that I, OTTO KUEKES, a citizen of the United States, residing at Pittsburgh, in the county of Allegheny and State of Pennsylvania, have invented certain new and useful Improvements in Cooking-Stoves, of which the following is a specification.

This invention relates to improvements in cooking stoves and has for its object to provide a cooking stove which may be used in connection with an illuminating gas fixture.

Another object of the invention is to provide a cooking stove consisting of a drum having a series of cooking compartments one above the other and a separate door into each compartment.

With the above and other objects in view I have invented the device illustrated in the accompanying drawings in which—

Figure 1 is a vertical sectional view of my device shown suspended from a wall and connected up with an illuminating gas burner, Fig. 2 is an elevational view thereof broken away at the bottom, Fig. 3 is a sectional view taken on line A—A of Fig. 1, Fig. 4 is an enlarged fragmental sectional view of a portion of the cooker showing a non-conducting lining. Fig. 5 is an elevational view of a modified form of the device shown partially broken away, Fig. 6 is a bottom plan view of Fig. 5, Fig. 7 is an elevational view of Fig. 1 and Fig. 8 is an enlarged sectional detail view of a gas pipe connecting member.

Like reference characters indicate like parts throughout the specification and in the various views in the drawings in which—

1 indicates an oven which is suspended from the wall 2 by means of a bracket 3 and the oven 1 consists of a cylindrical member 4 having inner and outer walls 5 and 6 and an asbestos or other nonconducting lining 7. The member 4 is provided with a series of annular inwardly projecting beads 8 which form supports for the foraminous shelves 9 which are of a length equal to the diameter of said oven and a width a little wider than the doorways 10 through which they may be projected by tilting them, their corners 11 and 12 projecting slightly beyond said doorways on each side whereby they are held in place. The doors 13 are each arcuate in form whereby they are slidable in the runners 14 and 15 against the surface of the wall 5. It will be particularly noticed, from Fig. 4 that the foraminous shelves are formed with corrugations transversely which add materially to the weight of the shelf and prevent it from buckling or caving in when objects are set down upon said shelves.

The oven is provided with an overlapping top 16 which is provided with a cover 17 whereby a warming oven is provided. An opening 18 is provided in said top and a slide 19 is located thereover whereby heat from the oven proper may be admitted into said warming compartment if desired.

The bottom 20 of the oven 4 is provided with a burner 21 having a pipe 22 projecting therethrough and an air chamber formed of a collar 23 for admitting air to said burner. Openings 24 admit air into said chamber and a slide 25 regulates the amount of air admitted. Said burner normally seats on said collar 23. A tube 26 having a flaring bottom 27 is slidable over the pipe 22 whereby it may be lowered over or raised from the pipe 28 on the gas fixture 29. Handles 30 are provided on the member 27 whereby it may be manipulated. The purpose of the flaring member 27 is to permit it to be wedged over the pipe 28 so as to prevent the escape of gas.

The oven is fixedly suspended from the wall 2 by means of the brackets 3, and when it is desired to use the oven the arm 29 is turned so that the tube 28 comes directly under the member 27, (after the gas tip is first removed) and the proper connections made and the gas lighted. In a very short time the oven will become very hot as the asbestos lining will prevent the escape of heat, and a number of dishes may be cooked therein at one time.

This stove will be very useful for nurseries, hospitals and for general cooking in small families and will consume only a very small amount of fuel and therefore is very economical, and can be used in connection with a gas fixture that must be used for illuminating purposes as the fixture may readily be disconnected from the oven.

In Figs. 5 and 6 I show a modification of the oven which in general construction is similar to the one shown in Fig. 1, except that no bottom is provided, but the wall 31 is provided with a horizontal annular flange 32 which is wide enough to prevent the oven from overturning when placed over a burner of an ordinary gas stove from which heat enters the opening 33 into the oven.

Having now described my invention that which I claim to be new and desire to protect by Letters Patent is:—

1. In combination with a gas bracket, an oven, brackets mounted above said gas bracket upon which said oven is supported, said oven having reduced openings in its bottom wall, a collar surrounding said openings to form an air chamber, and a burner in said oven connected with said gas bracket.

2. In combination with a swinging gas bracket, and an oven, brackets mounted above said gas bracket upon which said oven is supported, said oven having reduced openings in its bottom wall, a collar surrounding said openings to form an air chamber, and a burner in said oven connected with said gas bracket, said burner being normally seated upon said collar.

3. In combination with a swinging gas bracket, an oven, brackets mounted above said gas bracket upon which said oven is supported, said oven having reduced openings in its bottom wall, a collar surrounding said openings to form an air chamber, and a burner in said oven connected with said gas bracket, said burner being normally seated upon said collar, and an inverted funnel-shaped slip joint forming said connection.

4. In combination with a swinging gas bracket, an oven, brackets mounted above said gas bracket, upon which said oven is supported, said oven having reduced openings in its bottom wall, a collar surrounding said openings to form an air chamber, and a burner in said oven connected with said gas bracket, said burner being normally seated upon said collar, and an inverted funnel-shaped slip joint forming said connection, and means for regulating the amount of air admitted to said chamber.

5. In combination with a swinging gas bracket, an oven, brackets mounted above said gas bracket, upon which said oven is supported, said oven having reduced openings in its bottom wall, a collar surrounding said openings to form an air chamber, and a burner in said oven connected with said gas bracket, said burner being normally seated upon said collar, and an inverted funnel-shaped slip joint forming said connection, means for regulating the amount of air admitted to said chamber, and means affording access to the interior of said oven.

6. In combination with a swinging gas bracket, an oven, brackets mounted above said gas bracket, upon which said oven is supported, said oven having reduced openings in its bottom wall, a collar surrounding said openings to form an air chamber, a burner in said oven connected with said gas bracket, said burner being normally seated upon said collar, and an inverted funnel-shaped slip joint forming said connection, means for regulating the amount of air admitted to said chamber, and means affording access to the interior of said oven, said means consisting of arcuate sliding doors forming closures for openings into said oven.

In testimony whereof I affix my signature in presence of two witnesses.

OTTO KUEKES.

Witnesses:
 ALEX. J. WEDDERBURN, Jr.,
 WM. McC. HERRON.

Copies of this patent may be obtained for five cents each, by addressing the "Commissioner of Patents, Washington, D. C."